(12) United States Patent
Walker

(10) Patent No.: US 7,447,947 B2
(45) Date of Patent: Nov. 4, 2008

(54) SYSTEM AND METHOD FOR ECONOMIZING TRACE OPERATIONS

(75) Inventor: Brian J. Walker, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 606 days.

(21) Appl. No.: 11/144,335

(22) Filed: Jun. 3, 2005

(65) Prior Publication Data

US 2007/0011497 A1    Jan. 11, 2007

(51) Int. Cl.
*G06F 11/00* (2006.01)
(52) U.S. Cl. ...................................................... 714/45
(58) Field of Classification Search .................. 714/45, 714/46, 48, 57, 37, 42; 717/124, 127, 128–135
See application file for complete search history.

(56) References Cited

U.S. PATENT DOCUMENTS

| | | | |
|---|---|---|---|
| 6,282,701 B1 * | 8/2001 | Wygodny et al. | 717/125 |
| 6,658,416 B1 * | 12/2003 | Hussain et al. | 707/10 |
| 6,775,826 B1 * | 8/2004 | Zahavi et al. | 717/128 |
| 7,213,113 B2 * | 5/2007 | Sahin et al. | 711/162 |
| 7,240,334 B1 * | 7/2007 | Fluke et al. | 717/128 |
| 7,260,692 B1 * | 8/2007 | Zahavi et al. | 711/154 |
| 2002/0073063 A1 * | 6/2002 | Faraj | 707/1 |

* cited by examiner

*Primary Examiner*—Nadeem Iqbal
(74) *Attorney, Agent, or Firm*—Senniger Powers LLP

(57) ABSTRACT

A system and method of creating trace information of an application. Trace data of the application is stored in a trace heap. Processing of stored trace data including a hard-coded string is deferred.

18 Claims, 3 Drawing Sheets

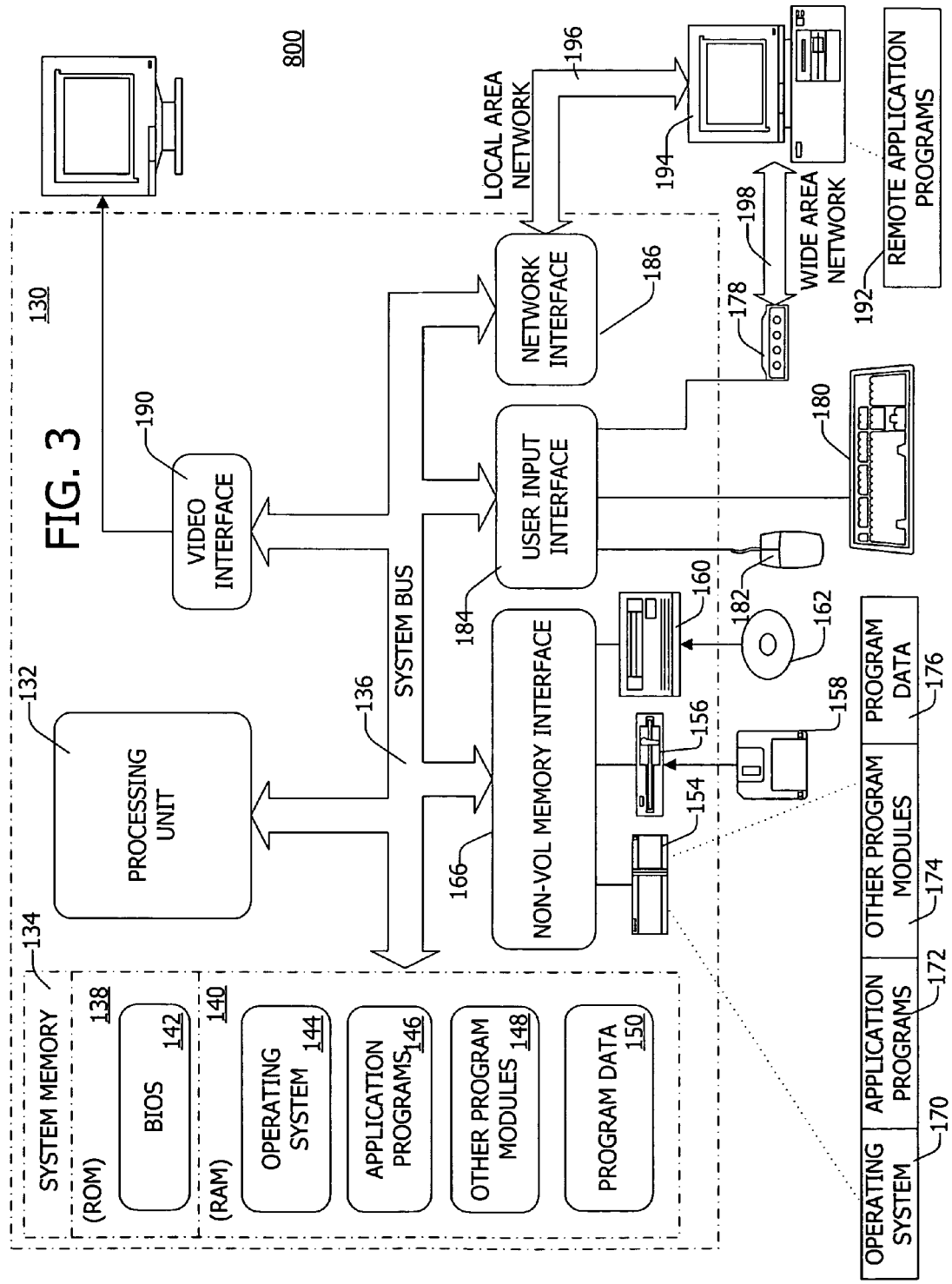

SYSTEM AND METHOD FOR ECONOMIZING TRACE OPERATIONS

TECHNICAL FIELD

Embodiments of the present invention relate to the field of economizing trace operations in order to improve application and system performance and to improve the value of data collected about application malfunctions. In particular, embodiments of this invention relate to storing information making up the trace in a memory conservative way.

BACKGROUND OF THE INVENTION

Tracing is an operation in which a program is executed in such a way that the sequence of statements being executed can be observed. In the event of a crash, hang, bug, glitch or other malfunction in the operation of the program, the trace assists in troubleshooting the malfunction by allowing the programmer to step through the trace information of the program, examine the data and monitor the conditions such as values of variables which occurred immediately prior to the malfunction.

When running an operation that pushes a processor of a computer to the limits of its maximum performance, e.g., video timeline playback, the memory overhead of traces can adversely affect such high performance operation. In addition, after a malfunction, attaching a debugger or troubleshooter to the process indicates the state of the process at the time of the problem. In non-simplistic cases, the cause of the malfunction frequently occurs prior to the malfunction and the information is lost or unavailable by the time a debugger or troubleshooter is attached. Also, on client machines, debuggers and/or troubleshooters are usually not part of the system of the client machine and clients do not want others installing other applications such as debuggers or troubleshooters on their machine. On the other hand, storing trace data ensures that the data will be available for analysis in the event of a malfunction.

Some prior systems maintain trace information. However, these systems lack an efficient way of minimizing the size of the memory needed for the trace information and lack an efficient way of processing the trace information so that it does not bog down the system processing.

Accordingly, a system for storing trace information of an application being run by a process without adversely affecting high performance operation of the processor and without requiring substantial memory is desired to address one or more of these and other disadvantages.

SUMMARY OF THE INVENTION

To minimize the effect of tracing on computer operation and to create useful trace information, trace data is stored in a special trace heap dedicated to the process. While the trace heap is being created, string processing of trace data entries is deferred until the trace information is physically dumped to an output location.

In one embodiment, there is one trace heap per process. Any string processing needed for the trace will not happen until the trace information is physically dumped to its output location. Also, since most traces are hard-coded strings in the code, as opposed to a runtime generated string, a hard-coded string can be detected so that only a pointer to it is stored. On the other hand, if a string is a runtime time generated string, then a copy of it with a pointer is stored in the trace heap. This trace information is stored in the trace heap until some user initiated action that dumps it. To keep from using up too much memory on the system with traces, the trace heap size may be limited, e.g., to one megabyte. When the trace heap memory fills up, the oldest trace information is deleted so that its memory can be used for the newest trace information.

In accordance with one aspect of the invention, a method of creating trace information of an application is provided. Trace data of the application is stored in a trace heap and processing of stored trace data which includes a hard-coded string is deferred.

In accordance with one aspect of the invention, a method of storing trace data of an application for use in evaluating the operation of the application when the application malfunctions is provided. Trace data from the application is stored in a trace heap. If the received trace data includes a hard-coded string, then a pointer which points to the hard-coded string is stored in the trace heap. If the received trace data includes a runtime string, then the runtime string is copied to the trace heap and a pointer which points to the runtime string copy in the trace heap is stored.

In accordance with one aspect of the invention, A data structure for trace information is provided comprising a trace heap including runtime strings, pointers to the runtime strings and pointers to hard-coded strings stored in a static memory.

Alternatively, the invention may comprise various other methods and apparatuses.

Other features will be in part apparent and in part pointed out hereinafter.

BRIEF DESCRIPTION OF THE DRAWINGS

FIG. 3 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
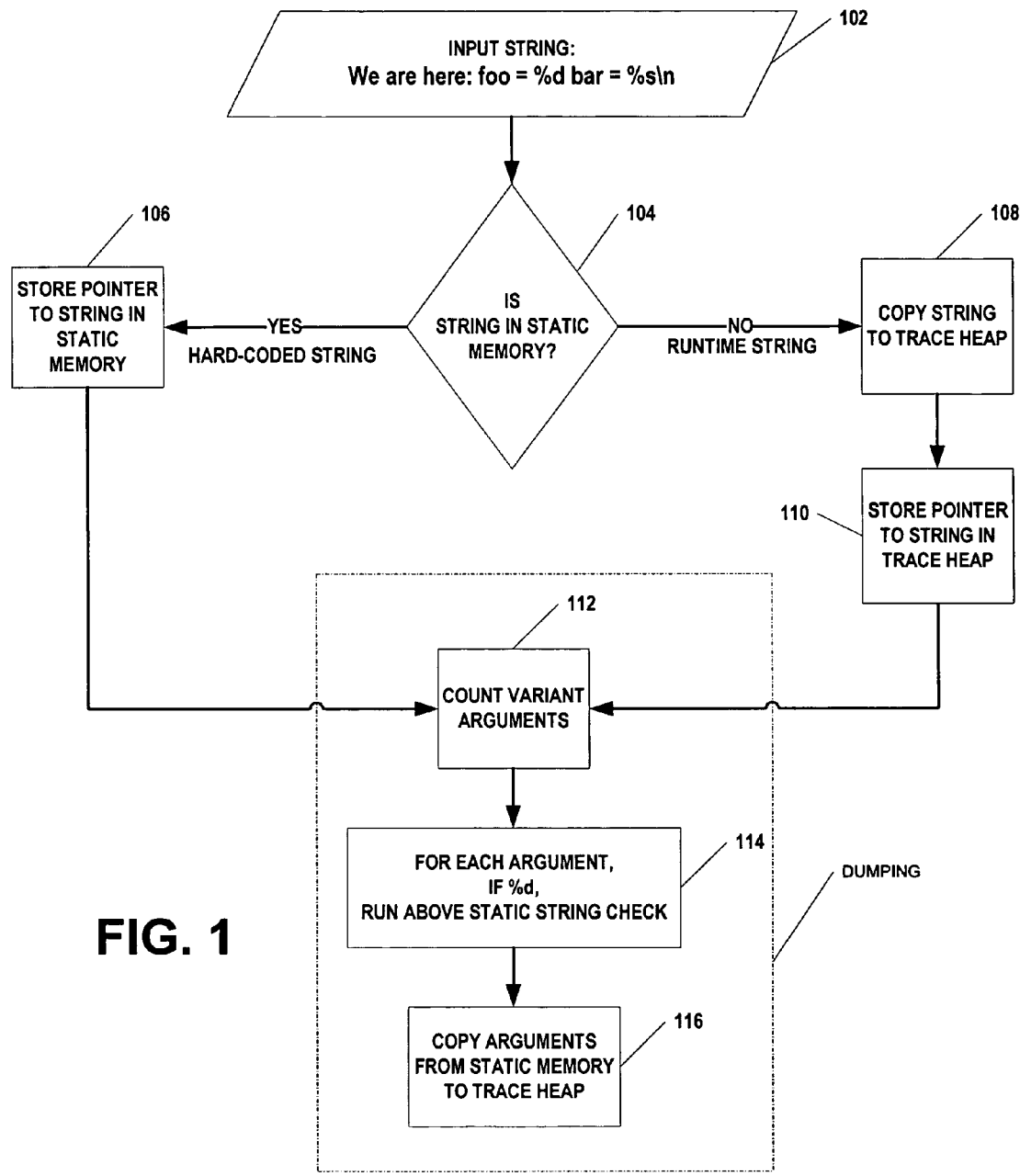
FIG. 1 is an exemplary flow chart illustrating operation of one preferred embodiment of the invention.

Referring to FIG. 1, an exemplary flow chart illustrating operation of one preferred embodiment of the invention is presented. At 102, trace data such as a trace call of an application is received from the application to be stored in the application's dedicated trace heap. The system and method of the invention determine if the string is a runtime string or a static hard-coded string at 104. This is accomplished by evaluating whether the string resides in static memory, e.g., the address space of the DLL/EXE. If the string is a hard-coded string in static memory, the system and method of the invention at 106 store in the trace heap a pointer which points to the string that is in static memory, thus deferring its processing.

If the string does not reside in static memory, e.g., a runtime string, the system and method of the invention make a copy of the string to the trace heap at 108. Also, a pointer to the string that is in the trace heap is stored in the trace heap at 110.

In the event that a malfunction of the application being traced, the trace heap may be dumped for analysis to assist in determining the cause of the malfunction. Initially, the system and method of the invention analyzes each pointer in the trace heap looking for % d, % s etc. in all the formats that printf supports. Printf is a function defined by c++ specification that describes replacing rules for strings. E.G printf("% d, % s", 4, "foo") will output as "4, foo". When doing this, the number of arguments that have been stored in the trace heap is determined at 112. While doing this, the system and method of the invention look for % s. If found, the operation ran on the original string is repeated, thereby looking to see where it resides in static memory at 114. After the number of variant arguments stored in the trace heap is found at 112, the contents of the call stack corresponding to the number just counted must be copied from stack memory to the trace heap. The arguments that have been counted are then copied from the stack memory, into the trace heap at 116. Using the above example, % d and % s are two arguments. Noticing % s, it is checked to se if it points to the static memory. In this case, it does not so no action is needed. If it pointed to the runtime memory, it would be copied to the trace stack and the pointer to point to the trace heap would be adjusted. Next, eight bytes (two 4 byte arguments) are copied from the stack to the trace heap. After doing this, the trace information is added into a link list of traces. The trace data is now ready for analysis of the malfunction.

Since pointers to the hard-coded strings are stored in the trace heap rather than the hard-coded string themselves, the processing burden on the processor to create and maintain the trace heap is significantly reduced. As a result, during periods of maximum processor operation, creating and maintaining the trace heap does not create a significant additional processing burden on the processor. Also, significantly less memory is used for the trace heap with pointers. For example, if a hard-coded string is 30 characters, it would take 60 bytes of storage whereas a pointer to the hard-coded string would only require 4 bytes.

When a dump call comes (e.g., DumpNow, usually in response to a malfunction), the link list is executed to call the CRT's trace functions passing in the stored string and stored stack copy. Using either pointer to static memory, or the copy made at trace time and the copy of the call stack arguments, the system and method can call into the CRT's trace function using the same arguments values that were provided at trace time. This causes the trace to be sent to the debugger, troubleshooter or other output source.

By establishing a DumpNow function and by storing the past X number of traces, when there is a malfunction, all that is needed is to dump the trace heap information for debugging and/or troubleshooting. To do this, the system and method export out of the DLL or EXE in which the operation is occurring to a DumpNow function. Preferably, the DumpNow function has a DWORD func(LPVOID) signature. In this way, using the exported function, another process can find the address of the DumpNow function. Once this other process has the address, it can use CreateRemoteThread to call that function in the hung/.crashed process. This causes that malfunctioned process to process all its traces.

For release tracing, in the past it has been a practice that the traces from the code are removed. Instead, according to the invention, the traces are compiled to unique IDs. Using a compile time tool, a map of traces IDs to the trace strings is created. The trace strings are put in another application that is not part of the system that malfunctioned and the trace IDs are put in the application that malfunctioned. When DumpNow is called, the trace Ids are dumped. The other application post-processes the traces after the dump to convert them back into human readable form.

In one embodiment, traces in code may take the following form or a similar form:

TRACE(L"We are here: foo=% d bar=% s\n", 5, "abc");

Using most tracing packages, this trace code compiles to an insignificant memory size in a release mode. In a debug mode, this trace code will call sprintf to evaluate the string and then call OutputDebugString to dump it. OutputDebugString then marshals the data to the debugger for display.

Figure 2:
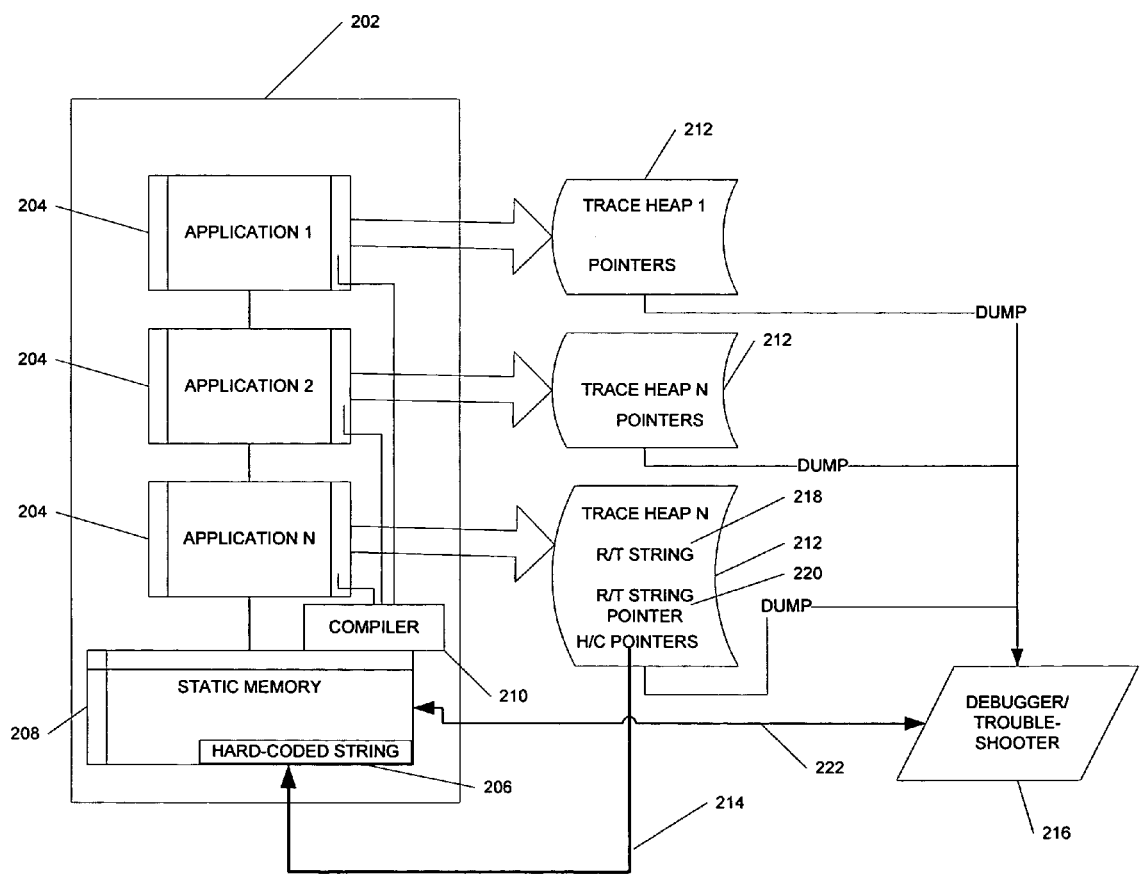
FIG. 2 is an exemplary block diagram illustrating a data structure of one preferred embodiment of the system and method of the invention.

When an application has many traces in it, it can severally hinder the performance of the application during periods of high processor usage. Instead, according the system and method of the invention, the information making up the trace is stored in a memory conservative way, as shown in FIGS. 1 and 2. As a processor 202 runs each of the 1-N applications 204, an input string is identified at 102 and the identified string is evaluated at 104 to determine whether the identified string is in static memory. The system and method of the invention take advantage of fact the most traces, like the one noted above, are hard-coded. If it is determined at 104 that the string is a hard-coded string 206 in static memory 208, a compiler 210 takes the string and puts it in the TEXT section of the DLL e.g., the static memory 208. This text section, when loaded into memory will reside in read only pages. Since these strings are read only and static, the system and method of the invention safely stores in the trace heap 212 a pointer 214 to the hard-coded string 206 (see 106 of FIG. 1) of each application for later processing without worrying about them going away or changing. As a result, only multiple occurrences of a string pointer are stored and not 20 copies of the same data. For example, if a trace is called 20 times, the system and method of the invention only store 20 pointers to the same data, not 20 copies of the same data. Since the trace heap 212 is used to do this processing and I/O devices are not called, the trace information is processed very quickly without causing locks in other parts of the code. In the event of a malfunction, as indicated at 222, the trace heaps can be dumped to debugger/troubleshooter 216 which can process the trace heaps and use the pointers 214 therein to access the static memory 206.

As noted above, a runtime string 218 is copied into the trace heaps 214 (see 108 of FIG. 1) and a pointer 220 to the runtime string is stored in the trace heap 214 (see 110 of FIG. 1). Thus, the trace information comprises a data structure including a trace heap 212 including runtime strings 218, pointers to the runtime strings 220 and pointers 214 to hard-coded strings stored in a static memory.

In one embodiment, it is contemplated that the string (L"We are here: foo=% d bar=% s\n", 5, "abc") from above would be stored away in another application and, instead, an identification like TRACEID__34 would be inserted in its place. The code inside the application would look like Trace (TRACEID__34, 5, ABC). This removes the string from the release product and reduces its size. When a DumpNow function is called, it would dump out TRACEID__34 to its output source. The dump log would have an entry in it, such as TRACEID__34, 5, abc. Another application that has the mapping would parse this dump log convert that string to L"We are here: foo=5, bar=abc".

To get the information in an application that has a malfunction, the system and method of the invention may use a CreateRemoteThead mechanism described above. In the case of certain malfunctions such as a crashed application, it may be necessary to avoid accessing the main process heap that is used by all other allocations inside the application, since the crash may have corrupted it. In this way, the data is still available from another source since there is a separate trace heap.

In one embodiment, the trace heap is designed to work within a fixed memory size so that memory consumption may be minimized. When the memory block fills up, the oldest traces are deleted to make room for new trace data. The method for dumping the trace data is also streamlined. Trace IDs, instead of actual traces, are compiled and exported. In particular, an allocator for the trace heaps may be designed to work in a fixed memory size. After filling up its memory block it will start removing traces from the beginning of the linked list to make the allocations work. If the current trace is big and the traces at the beginning of the link list are small, it may take multiple traces being removed to make the allocation succeed.

FIG. 3 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 3 illustrates operating system 144, application programs 146, other program modules 148, and program data 150.

The computer 130 may also include other removable/non-removable, volatile/nonvolatile computer storage media. For example, FIG. 3 illustrates a hard disk drive 154 that reads from or writes to non-removable, nonvolatile magnetic media. FIG. 3 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 3, provide storage of computer readable instructions, data structures, program modules and other data for the computer 130. In FIG. 3, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 3 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 3 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 1 to create and dump the trace heap.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of creating trace information of an application comprising:

storing trace data of the application in a trace heap;

deferring processing of stored trace data including a hard-coded string by dumping the stored trace data to an output location and processing the hard-coded strings after dumping;

analyzing each pointer in the trace heap;

determining the arguments as indicated by the analyzed pointers in the trace heap;

for each string having an argument indicating that it is a hard-coded string, moving the string up in the trace heap so that it is executed above a static string check; and copying the argument of the moved up string from static memory to the trace heap.

2. The method of claim 1 further comprising dumping the stored trace data to an output location and processing the hard-coded strings after dumping.

3. The method of claim 1 wherein storing comprises designating a separate trace heap for each application and storing the trace data of a particular application in its designated trace heap.

4. The method of claim 3 wherein the trace heap has a predefined size and wherein, when the trace heap is full of trace data, new trace data is written over older trace data.

5. The method of claim 1 wherein storing comprises designating a separate trace heap for each application and storing the trace data of a particular application in its designated trace heap.

6. The method of claim 1 wherein the trace heap has a predefined size and wherein, when the trace heap is full of trace data, new trace data is written over older trace data.

7. A method of storing trace data of an application for use in evaluating the operation of the application when the application malfunctions, said method comprising:

storing trace data from the application in a trace heap;

if the received trace data includes a hard-coded string, then storing in the trace heap a pointer which points to the hard-coded string;

if the received trace data includes a runtime string, then copying the runtime string to the trace heap and storing a pointer which points to the runtime string copy in the trace heap;

analyzing each pointer in the trace heap;

determining the arguments as indicated by the analyzed pointers in the trace heap;

for each string having an argument indicating that it is a hard-coded string, moving the string up in the trace heap so that it is executed above a static string check; and copying the argument of the moved up string from static memory to the trace heap.

8. The method of claim 7 further comprising dumping the stored trace data to an output location and processing the hard-coded strings after dumping.

9. The method of claim 7 wherein storing comprises designating a separate trace heap for each application and storing the trace data of a particular application in its designated trace heap.

10. The method of claim 9 wherein the trace heap has a predefined size and wherein, when the trace heap is full of trace data, new trace data is written over older trace data.

11. The method of claim 7 wherein the trace heap has a predefined size and wherein, when the trace heap is full of trace data, new trace data is written over older trace data.

12. A computer readable storage medium having a data structure for trace information including a trace heap including runtime strings, pointers to the runtime strings and pointers to hard-coded strings stored in a static memory, said data structure comprising instructions for:

analyzing each pointer in the trace heap;

determining the arguments as indicated by the analyzed pointers in the trace heap;

for each string having an argument indicating that it is a hard-coded string, moving the string up in the trace heap so that it is executed above a static string check; and copying the argument of the moved up string from static memory to the trace heap.

13. The computer readable storage medium of claim 12 wherein a separate trace heap is designated for each application and the trace data of a particular application is stored in its designated trace heap.

14. The computer readable storage medium of claim 13 wherein the trace heap has a predefined size and wherein, when the trace heap is full of trace data, new trace data is written over older trace data.

15. The computer readable storage medium of claim 12 wherein a separate trace heap is designated for each application and the trace data of a particular application is stored in its designated trace heap.

16. The computer readable storage medium of claim 12 wherein the trace heap has a predefined size and wherein, when the trace heap is full of trace data, new trace data is written over older trace data.

17. The computer readable storage medium of claim 12 farther including instructions for deferring processing of stored trace data including a hard-coded string by dumping the stored trace data to an output location and processing the hard-coded strings after dumping.

18. The computer readable storage medium of claim 12 further comprising instructions for storing in the trace heap a pointer which points to the hard-coded string if the received trace data includes a hard-coded string; and if the received trace data includes a runtime string, then copying the runtime string to the trace heap and storing a pointer which points to the runtime string copy in the trace heap.

* * * * *

UNITED STATES PATENT AND TRADEMARK OFFICE
CERTIFICATE OF CORRECTION

| | |
|---|---|
| PATENT NO. | : 7,447,947 B2 |
| APPLICATION NO. | : 11/144335 |
| DATED | : November 4, 2008 |
| INVENTOR(S) | : Brian J. Walker |

It is certified that error appears in the above-identified patent and that said Letters Patent is hereby corrected as shown below:

In column 10, line 38, in Claim 17, delete "farther" and insert -- further --, therefor.

Signed and Sealed this
Third Day of May, 2011

David J. Kappos
*Director of the United States Patent and Trademark Office*